(12) United States Patent
Williams et al.

(10) Patent No.: US 9,352,820 B2
(45) Date of Patent: May 31, 2016

(54) DEVICE MOUNT FOR AN INFLATABLE STRUCTURE

(75) Inventors: Robert B. Williams, West Hollywood, CA (US); Kyle W. Maxhimer, Hermosa Beach, CA (US); Larry L. Lai, Walnut, CA (US); Thomas Brennan, Marina Del Rey, CA (US)

(73) Assignee: Raytheon Company, Waltham, MA (US)

( * ) Notice: Subject to any disclaimer, the term of this patent is extended or adjusted under 35 U.S.C. 154(b) by 1010 days.

(21) Appl. No.: 13/466,415

(22) Filed: May 8, 2012

(65) Prior Publication Data

US 2013/0299654 A1 Nov. 14, 2013

(51) Int. Cl.
*B64B 1/00* (2006.01)
*B64B 1/58* (2006.01)
*B64B 1/14* (2006.01)
*H01Q 1/12* (2006.01)

(52) U.S. Cl.
CPC ... *B64B 1/58* (2013.01); *B64B 1/14* (2013.01); *H01Q 1/1292* (2013.01)

(58) Field of Classification Search
CPC ........ H01Q 1/286; H01Q 1/1292; B64B 1/18; B64B 1/42
USPC .............. 244/33, 54, 127; 342/26 B; 343/706
See application file for complete search history.

(56) References Cited

U.S. PATENT DOCUMENTS 1,103,388 A * 7/1914 Waterman ...................... 244/127
2,865,581 A * 12/1958 Froehlich .................. B64B 1/40
244/127
3,129,911 A * 4/1964 Fitzpatrick ..................... 244/125
3,255,502 A 6/1966 Hollins
4,125,233 A * 11/1978 Winker ...................... B64B 1/42
244/126
4,635,581 A * 1/1987 Scheurer ................. B64B 35/73
114/345
5,456,426 A * 10/1995 Wexler .......................... 244/127

(Continued)

FOREIGN PATENT DOCUMENTS

DE 3440012 A1 5/1976
DE 202011001943 U1 5/2011

(Continued)

OTHER PUBLICATIONS

Machine Translation of Kurose JP 2005059793 A, pulled Mar. 30, 2015, p. 1-37.*
International Search Report and Written Opinion from corresponding International Application No. PCT/US13/26029, mailed on Apr. 29, 2013.

*Primary Examiner* — Elizabeth A Quast
(74) *Attorney, Agent, or Firm* — Renner, Otto, Boisselle & Sklar

(57) ABSTRACT

An inflatable structure mount is used for mounting a device to an inflatable structure. An example is mounting of radar panels to an inflatable structure within an airship. The mount includes the device, and inserts coupled to the back side of the device, which mechanically couple to flexures mounted on the inflatable structure. Some of the flexures may have slotted holes, used in positioning the inserts on the inflatable structure at positions that will allow the flexures to mate with the inserts. A jig or tool may be used as part of the installation process, to locate the flexures at points where they will properly engage the inserts. The flexures may also each face a center point that is underneath the device to be mounted. The flexures may engage the inserts in ways that allow for quick installation and de-installation of devices, and may allow for visual inspection of proper installation.

10 Claims, 6 Drawing Sheets

(56) References Cited

U.S. PATENT DOCUMENTS

| | | | |
|---|---|---|---|
| 6,290,176 B1 * | 9/2001 | Hankinson et al. | 244/125 |
| 6,302,759 B1 * | 10/2001 | Hsieh | 446/220 |
| 2003/0234320 A1 * | 12/2003 | Colting | B64B 1/02 244/96 |
| 2006/0048350 A1 | 3/2006 | Coulombe et al. | |
| 2008/0030413 A1 * | 2/2008 | Lee et al. | 343/705 |
| 2010/0300347 A1 | 12/2010 | Kang et al. | |
| 2011/0298687 A1 | 12/2011 | Maxhimer et al. | |

FOREIGN PATENT DOCUMENTS

| | | | | |
|---|---|---|---|---|
| FR | 2723263 A1 * | 2/1996 | | H01Q 15/20 |
| JP | 2005059793 A * | 3/2005 | | |
| RU | 2236366 C2 * | 9/2004 | | |
| WO | 209129799 A1 | 10/2009 | | |

* cited by examiner

DEVICE MOUNT FOR AN INFLATABLE STRUCTURE

GOVERNMENT RIGHTS STATEMENT

This invention was made with United States Government support under Contract Number HR0011-09-C-0036, Subcontract DG7960005K, awarded by the Department of Defense. The United States Government has certain rights in this invention.

BACKGROUND OF THE INVENTION

1. Field of the Invention

The invention is in the field of mounts for placing devices on inflatable structures.

2. Description of the Related Art

Many problems exist with mounting devices to inflatable structures. First, inflatable structures often have imprecision in where structural mounting points are located. This makes it more difficult to mount devices accurately on the structures.

In addition inflatable structures and the devices mounted on them often have different coefficients of thermal expansion, with sometimes the inflatable structures even having a negative coefficient of thermal expansion (shrinking as temperature is increased). It would be desirable to avoid undue forces on the devices as the device and the inflatable structure change temperature.

Further, it would be desirable to have devices installed on inflatable structures so that installation and de-installation is facilitated. In view of these problems with current systems and methods for mounting devices on flexible structures, improvements would be desirable.

SUMMARY OF THE INVENTION

According to an aspect of the invention, a mount for an inflatable structure includes: a device to be mounted; inserts coupled to a back side of the device; and flexures to be coupled to the inflatable structure. The flexures mechanically couple to the inserts to mount the device on the inflatable structure. The flexures each face a center point that is underneath a center of the device to be mounted, when the device is mounted to the inflatable structure.

According to another aspect of the invention, a mount for an inflatable structure includes: a device to be mounted; inserts coupled to a back side of the device; and flexures to be coupled to the inflatable structure. The flexures have respective bases with respective sets of mounting holes for mounting the flexures to mounting blocks on the inflatable structure, with the mounting holes of some of the flexures having at least one of different size or different shape than the mounting holes of other of the flexures.

According to yet another aspect of the invention, a mount for an inflatable structure includes: a device to be mounted; inserts coupled to a back side of the device; and flexures to be coupled to the inflatable structure. The flexures mechanically couple to the inserts to mount the device on the inflatable structure by insertion of respective blades of the flexures into the inserts to releasably couple the flexures and the inserts.

According to still another aspect of the invention, a method of coupling a device to an inflatable structure includes coupling the device using flexures that all preferentially flex in a line that includes a center of the device.

According to a further aspect of the invention, a method of installing a device on an inflatable structure includes positioning flexures on the inflatable structure, and then coupling inserts on the back of the device to the flexures. The flexures may be positioned using a jig or tool that provides an indication of where the inserts are located on the back of the device. Positioning the flexures may be accomplished by first positioning a close-hole flexure to set the overall position of the device, positioning a slotted-hole flexure relative to the close-hole flexures, and finally positioning one or more open-hole flexures. The slotted-hole flexure may have a larger positional tolerance than the close-hole flexure in a single direction, such as a direction between the close-hole flexure and the slotted-hole flexure. The open-hole flexures may have a larger positional tolerance than the close-hole flexures in all directions, for example having larger round holes than the round holes of the close-hole flexure. The flexures may have blades that are inserted in the insert, and the blades may have visual indicators indicating when the flexures are fully mechanically coupled to the inserts. The method may further include visually examining the blades to make sure that the blades are fully inserted into the inserts, for example by use of a mirror, a fiber-optic device, or other suitable visual devices. The device may be de-installed by releasing locking levers of the inserts, for example by pulling strings or other members coupled to the locking levers, to release the blades of the flexures from the inserts.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

An inflatable structure mount is used for mounting a device to an inflatable structure. An example is mounting of radar panels to an inflatable structure within an airship. The mount includes the device, and inserts coupled to the back side of the device, which mechanically couple to flexures mounted on the inflatable structure. Some of the flexures may have slotted holes, used in positioning the inserts on the inflatable structure at positions that will allow the flexures to mate with the inserts. A jig or tool may be used as part of the installation process, to locate the flexures at points where they will properly engage the inserts. The flexures may also each face a center point that is underneath the device to be mounted. This arrangement of flexures may allow the device to better accommodate forces that may result from a change in temperature, due to differences in coefficients of thermal expansion. The flexures may engage the inserts in ways that allow for quick installation and de-installation of devices, and may allow for visual inspection of proper installation.

Figure 1:
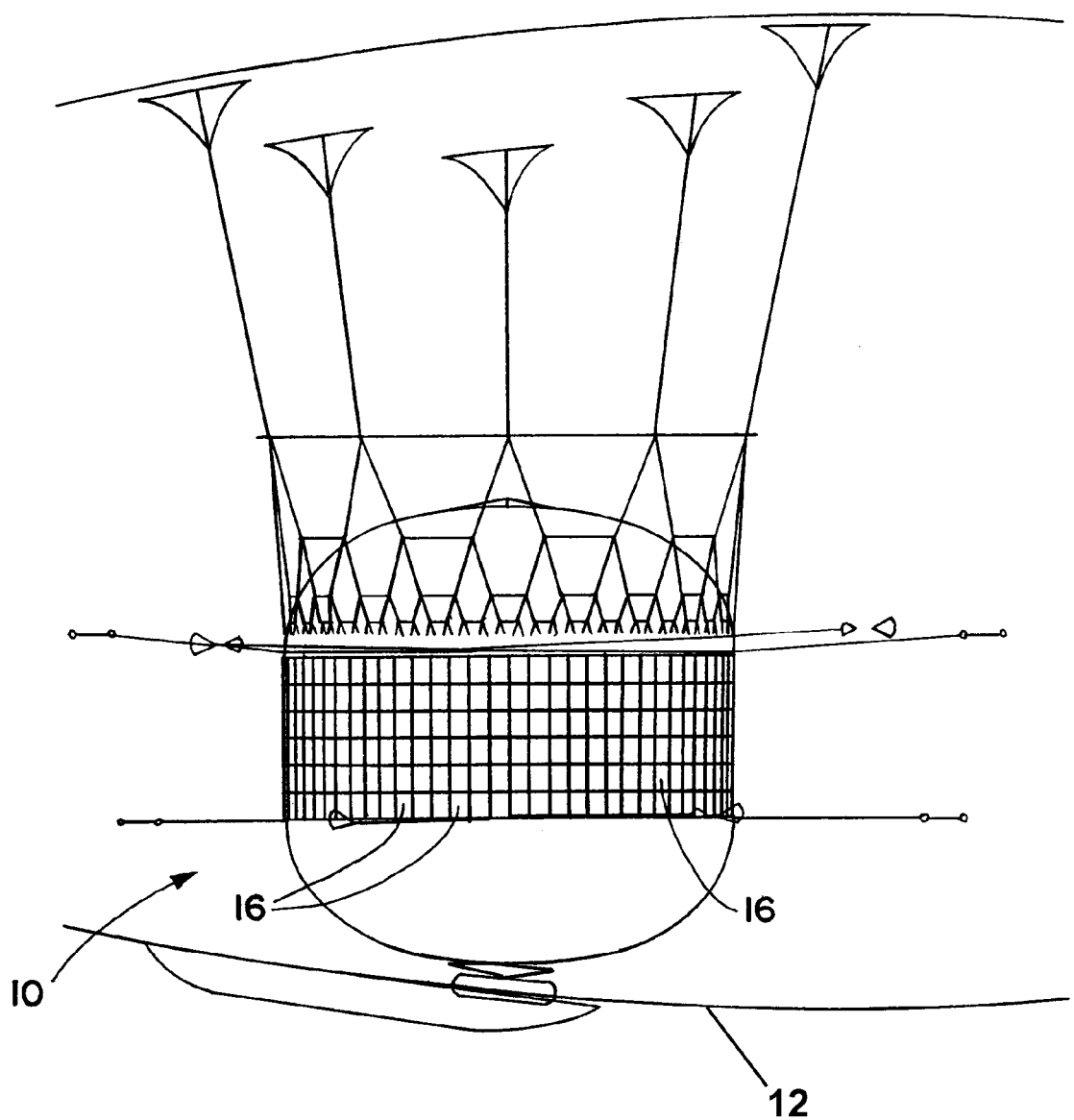
FIG. 1 is an oblique view of an inflatable structure with devices mounted on them, in accordance with an embodiment of the invention.

FIG. 1 shows an inflatable structure 10, a support used inside an aerial vehicle such as a blimp 12. The inflatable structure 10 may be used to mount devices 16, such as multiple radar panels, for use during operation of the aerial vehicle. The inflatable structure 10 and devices 16 may have any of a variety of forms, with the illustrated support and radar panels being only examples. For example the inflatable structure alternatively may be used to mount one or more devices to an exterior of an aerial vehicle.

Figure 2:
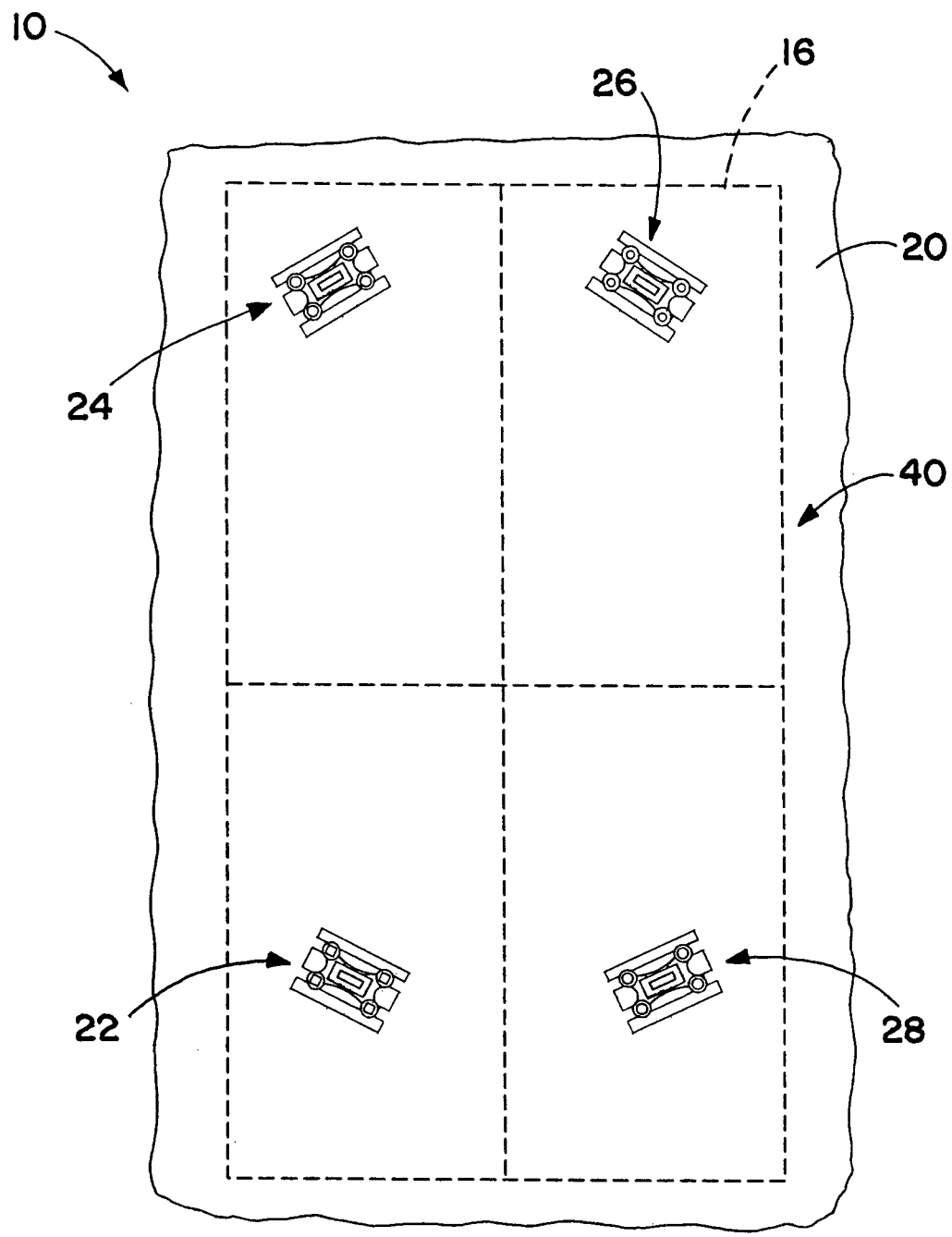
FIG. 2 is a plan view of a portion of the inflatable structure of FIG. 1.
Figure 3:
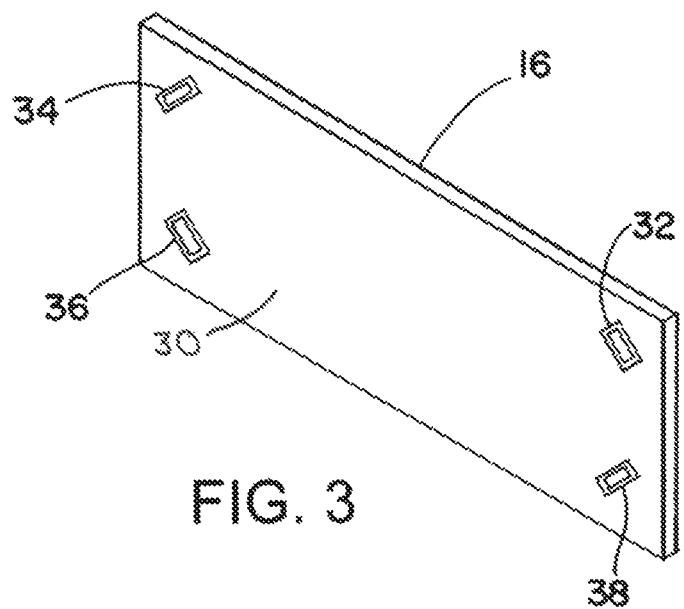
FIG. 3 is a plan view showing the back side of a device to be mounted on the inflatable structure.

Referring now in addition to FIGS. 2 and 3, FIG. 2 shows a portion 20 of the inflatable structure 10, with an array of flexures 22, 24, 26, and 28 mounted on the surface of the inflatable structure portion 20, underneath the device 16 (when the device 16 is installed). FIG. 3 shows a back side 30 of the device 16, with inserts 32, 34, 36, and 38 mounted on the back side at locations corresponding to the locations of the flexures 22-28. The flexures 22-28 mate with the inserts 32-38 to mechanically connect the device 16 to the inflatable structure 10, with the flexures 22-28, the inserts 32-38, and their associated parts, collectively constituting a structure mount 40.

Figure 4:
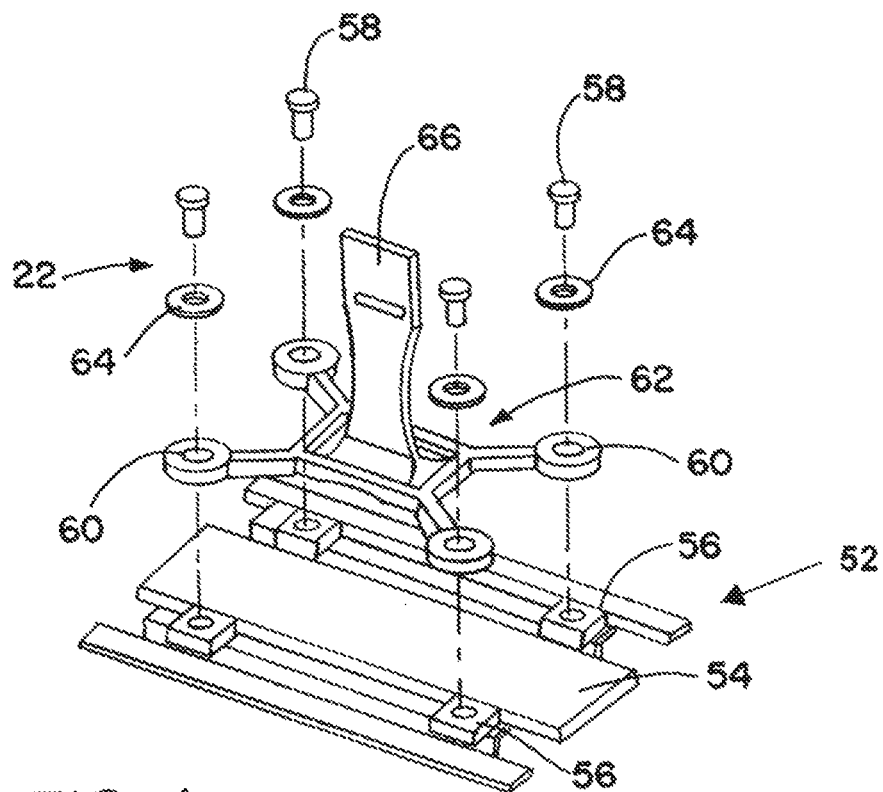
FIG. 4 is an exploded view of a flexure and mount for engaging an insert on the back of the device of FIG. 3, to aid in mounting the device on the inflatable structure.

FIG. 4 shows details of how the flexure 22 is mounted onto the inflatable structure portion 20. The other flexures 24-28 may be mounted in similar ways. The mounting 52 for the flexure 22 includes a mounting block 54 that is heat sealed to the inflatable structure 10, prior to final assembly and inflation of the inflatable structure 10. The mounting block includes four threaded inserts 56 that receive screws 58. The screws 58 pass through holes 60 in a base 62 of the flexure 22, and perhaps through intervening washers 64, and threadedly engage to threaded inserts 56, to secure the flexure 22 to the inflatable structure 10.

Elastic properties of the composite material inflatable structure may vary considerably within a single structure, or from structure to structure. This may lead to poor positional tolerance in the positioning of the mounting block 54 (and the mounting blocks for the other flexures 24-28). The positional tolerance in the placement of the mounting block 54 may be one or two orders of magnitude greater than that of machined metal structures. Therefore some mechanism is needed to allow the flexures 22-28 to be positioned on the structure portion 20 so as to line up with the inserts 32-38 (FIG. 3) on the device 30 (FIG. 3). The positioning must be accurate enough such that blades of the flexures 22-28, such as the blade 66 of the flexure 22, are inserted into the inserts 32-38 when the device 16 is mounted on the structure portion 20.

Figure 5:
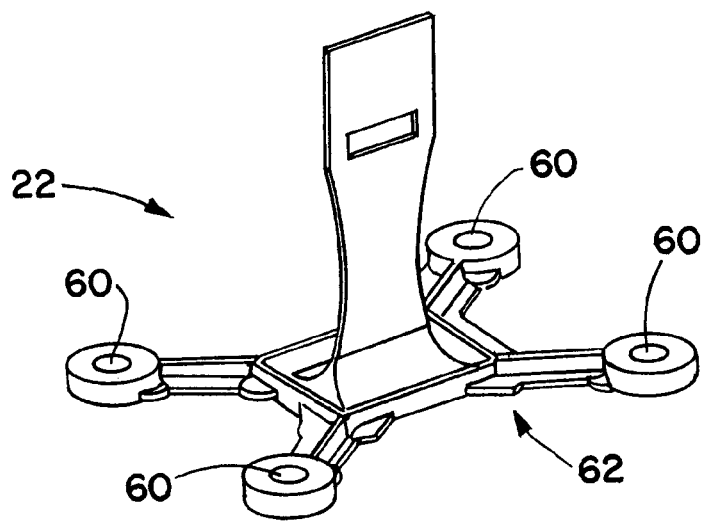
FIG. 5 is an oblique view of a close-hole flexure used in mounting the device.

FIG. 5 illustrates one arrangement for compensating for the positional tolerance variations for the mounting blocks for the flexures 22-28. The base 62 of the flexure 22 is a close-hole base, with relatively small round holes 60 for receiving the screws 58. The relatively small holes 60 allow for a relatively small amount of positional variability in positioning the flexure 22 on the mounting block 54.

Figure 6:
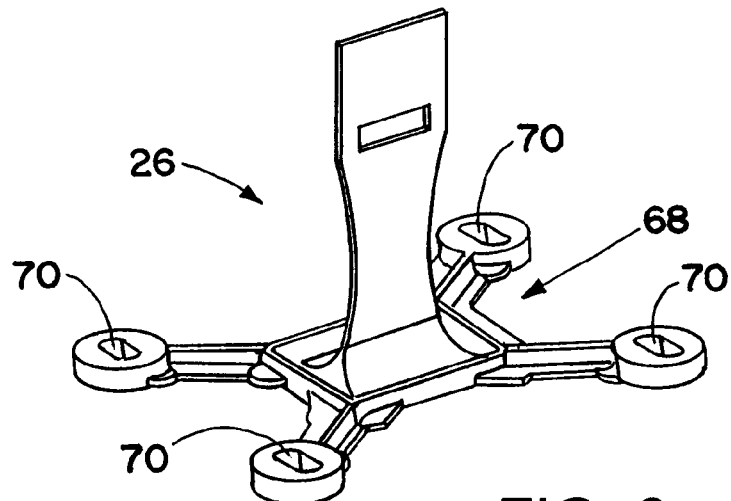
FIG. 6 is an oblique view of a slotted-hole flexure also used in mounting the device.

With reference to FIG. 6, the opposite flexure 26 has a slotted-hole base 68 that has elongated slots 70. The slotted-hole base 68 allows variable positioning of the flexure 26, with a greater amount of variability obtainable by making small rotations of the base 68. This direction that the slots 70 are elongated is in the direction between the flexures 22 and 26.

Figure 7:
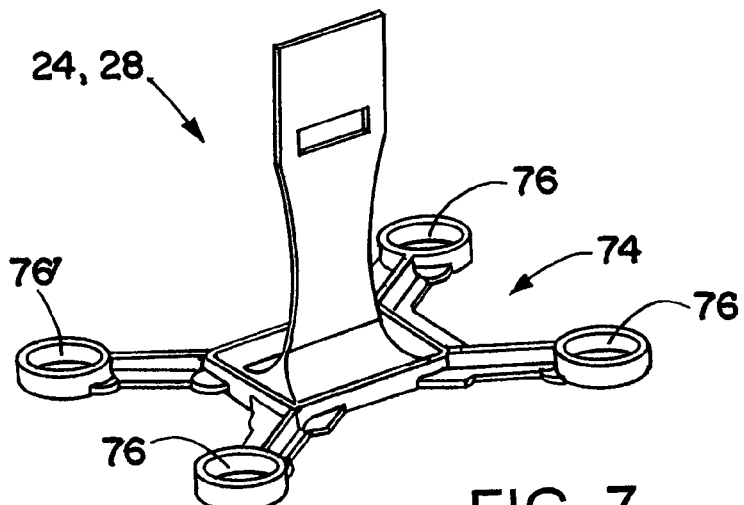
FIG. 7 is an oblique view of an open-hole flexure used as well in mounting the device.

Referring not to FIG. 7, the other two flexures 24 and 28 have oversized-hole flexure bases 74, with round mounting holes 76 therein. The round holes 76 are relatively large holes, larger than the holes 60 in the base 62 of the flexure 22. Suitably-sized washers (not shown) may be used in mounting the flexures 24 and 28 to corresponding mounting blocks, to allow heads of mounting screws to engage the sides of the bases 74 around the oversized holes 76. The bases 74 allow large variability in the positioning of the flexures 24 and 28 in any of a variety of directions.

The flexures 22-28, with their different variability in positioning, together make the mount 40 a kinematic mount for mounting the device 16 (FIG. 3) to the structure portion 20, with the ability to resolve the large positional tolerances in the mounting of the mounting blocks on the structure portion 20. The close-hole base 62 sets the overall position of the device 16 relative to the structure portion 20. After the close-hole base 62 is secured to its mounting block, the slotted-hole base 68 can be secured, with the slotted-hole base 68 being rotated relative to the close-hole base 62 to allow the slotted-hole base 68 to be secured onto its mounting block with screws. Finally the two flexures 24 and 28 with the oversized-hole flexure bases 74 are installed on their mounting blocks. The oversized holes 76 in the bases 74 allow a large positional tolerance for the flexures 24 and 28, with the flexures 24 and 28 able to be positioned to engage their mounting blocks without doing so in a way that would stress the device 16, when the device 16 is mounted on the flexures 22-28. The kinematic mount thus allows positioning of the flexures 22-28 to engage the corresponding inserts 32-38, without putting any undue stresses on the device 16 to be mounted.

Figure 8:
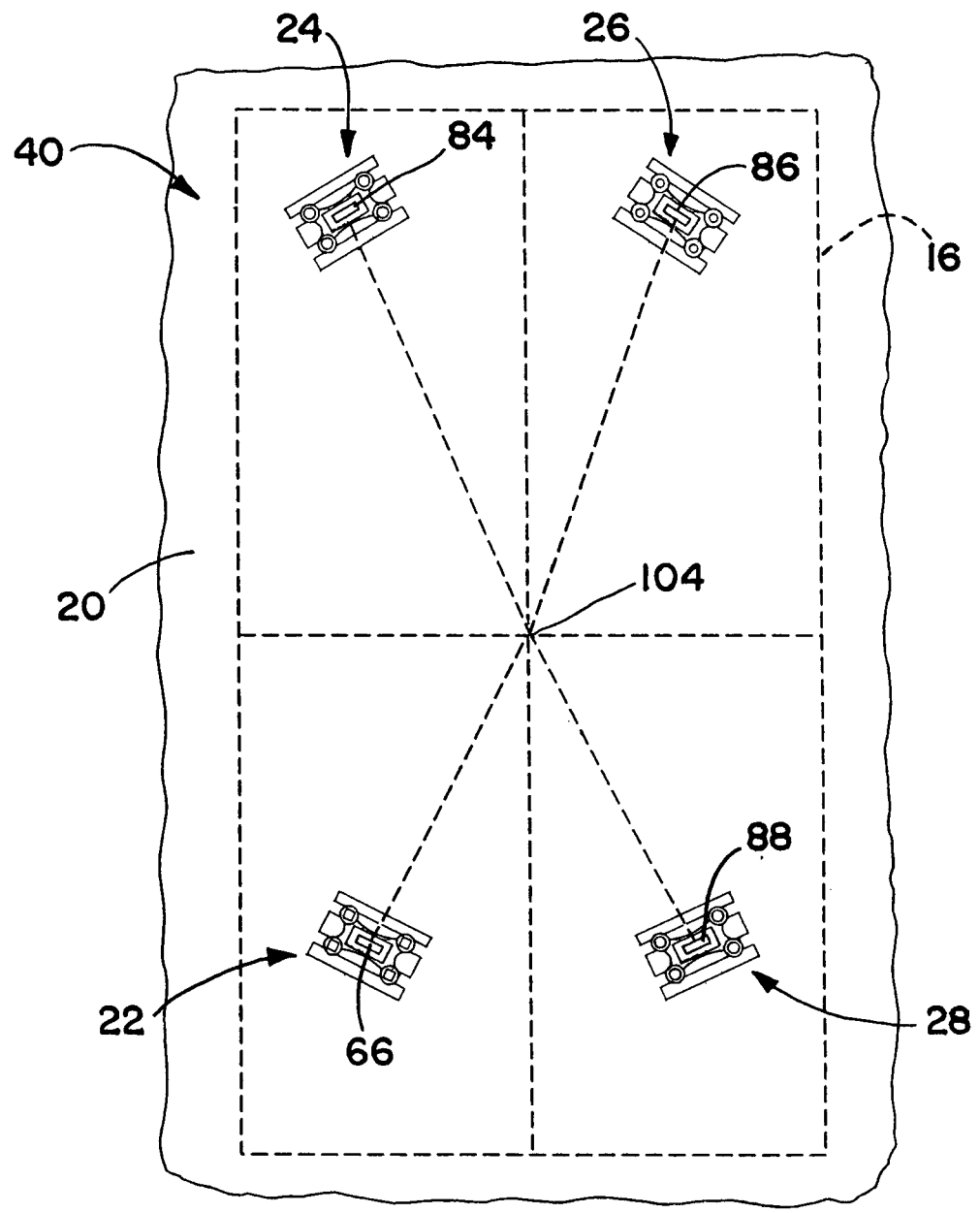
FIG. 8 is a plan view illustrating orientation of blades of the flexures, according to an embodiment of the invention.
Figure 9:
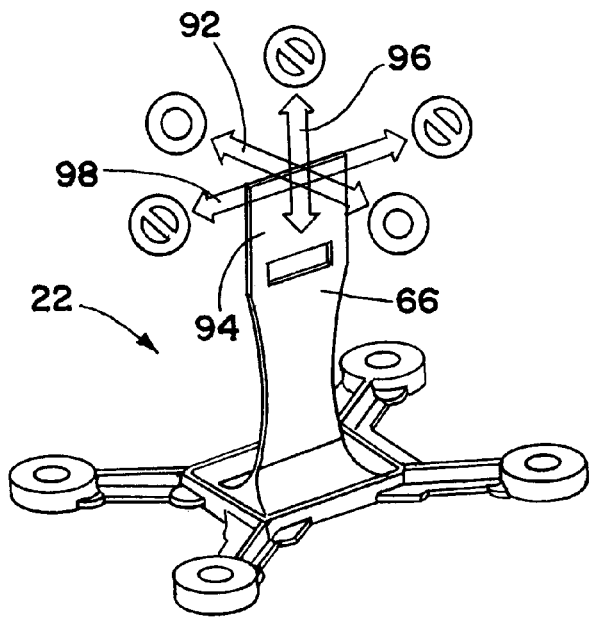
FIG. 9 is an oblique view illustrating the preferred flexing direction of the flexures of the mounting of FIG. 8.

FIG. 8 shows another aspect of the mount 40, its ability to decouple the in-plane motions of the structure portion 20 and the device 16. The structure portion 20 and the device 16 may have very different coefficients of thermal expansion, such that temperature changes in the environment may result in different expansions of the two. The inflatable structure 10 may be made of a liquid crystal polymer fiber material, such as the material sold under the trademark VECTRAN. Such a material may have coefficient of thermal expansion that is near zero or even negative. Therefore without some form of compensation, the differences in coefficients of thermal expansion would put unwanted stresses on the device 16. The flexures 22-28 have respective blades 66, 84, 86, and 88. The blades 66 and 84-88 each provide one degree of freedom, with preferential bending of the blades in a direction perpendicular to major surfaces of the blades. This is illustrated in FIG. 9, with the degree of freedom for the blade 66 in direction 92, perpendicular to a major surface 94 of the blade 82. The blade 66 easily flexes in the direction 92, but does not easily flex in directions 96 and 98, directions that are parallel to the major surface 94, and perpendicular to the direction 92 (and each other).

Referring back to FIG. 8, the flexures 22-28 are oriented such that the blades 66 and 84-88 are facing a center point 104 of the device 16. That is, the degree of freedom of each of the blades 66 and 84-88 is oriented toward the center point 104. This arrangement of the flexures 22-28 minimizes the effect of the loads induced by temperature changes. Although only three flexures would be required to support the device 16, using the four flexures 22-28 provides support to all corners of the device 16. The quasi-kinematic mount with the four flexures 22-28 induces more in-plane loads than three flexures would (the system is overdetermined), but these induced loads are minimized by pointing the flexure degree of freedom directions toward the center point 104.

Figure 10:
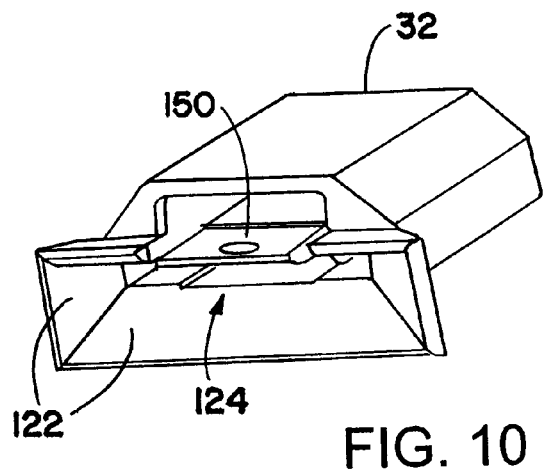
FIG. 10 is an oblique view of an insert used in mounting the device.
Figure 11:
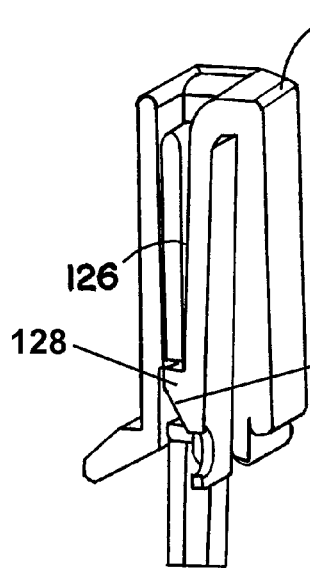
FIG. 11 is a first cutaway view showing engagement of a blade of a flexure and a locking lever of the insert of FIG. 10.
Figure 12:
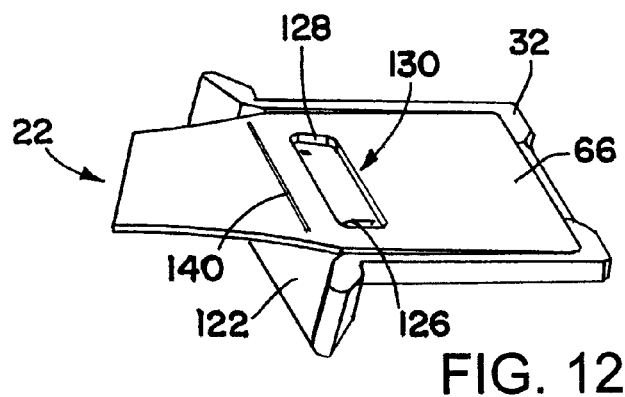
FIG. 12 is a second cutaway view showing engagement of the blade of the flexure and the locking lever of the insert.

FIGS. 10-12 illustrate details of the inserts 32-38, and the engagement of the blades of the flexures 22-28 in them. In FIGS. 10-12 the insert 32 and the blade 66 of the flexure 22 are shown for illustration purposes, but the same explanation applies for the other inserts 34-38 and flexures 24-28. The insert 32 includes self-aligning features 122 that urge the incoming blade 66 toward an opening 124 that receives the blade. A locking lever 126 of the insert 32 has a locking protrusion feature 128 that engages a slot 130 in the blade 66, once the blade 66 is fully inserted into the insert 32. The locking feature 128 has a sloped front surface 134 that is engaged by the blade 66 as the blade 66 is inserted into the opening 124. This causes the locking lever 126 to resiliently bend, allowing the blade 66 to be inserted into the opening 124. Once the blade 66 is inserted far enough for the locking feature 128 to be aligned with the slot 130, the locking lever 126 resiliently snaps back, with the locking feature 128 entering into the slot 130 to lock the blade 66 into engagement with the insert 32. A visual indicator 140, such as a visible line that may be formed on or as a part of the blade 66, may be used to visually indicate that the flexure 22 is fully engaged with the insert 32. Visual inspection of the engagement of the flexures 22-28 and the inserts 32-38 may be performed using mirrors or fiber-optic devices, for example.

The locking feature 128 has a hole 150 in it for receiving a string or other device (not shown). Pulling on the string causes the locking lever 126 to resiliently deform, disengaging the locking feature 128 from the slot 130, and allowing the blade 52 to be pulled out of the insert 32.

Installation of the device 16 (FIG. 1) onto the inflatable structure 10 may be accomplished by first positioning the flexures 22-28 (FIG. 2) on the structure 10 so as to properly mate with the inserts 32-38 (FIG. 3). The positioning of the flexures 22-28 on the already-installed mounting blocks may be preformed with the aid of a template that provides an indication of the positions of the inserts 32-38 on the device 16. The template may be a plate with holes indicating the position of the inserts 32-38 on the actual device 16. For many devices to be mounted, such as radar panels, the locations of inserts on individual devices is substantially the same from device to device, enabling use of a standard template for positioning the flexures 22-28.

Once the flexures 22-28 have been properly positioned on the inflatable structure 10, the device 16 may be installed by pressing the device 16 onto the structure 10, with the pressing causing the inserts 32-38 to mechanically engage with the flexures 22-28. The engagement of the flexures 22-28 and the inserts 32-38 may be visually confirmed by use of the visual indicator 140 (FIG. 12) on the blades 52-58 of the flexures 22-28. The flexures 22-28 and the inserts 32-38 may be made from any of a variety of suitable materials, such as suitable plastics.

In releasing the device 16 from the inflatable structure 10, a user first releases the locking features 128 of the inserts 32-38. Then the device 16 may be removed from the structure 10.

The use of the flexures 22-28 and the inserts 32-38 allows for rapid installation and de-installation of the device 16. For example, radar panels may be installed and de-installed in about a minute. Rapid installation and de-installation may be advantageous because there may be an advantage in able to quickly replace the devices 16 and/or change the positions of the devices 16. For example radar panels may have different levels of performance that may only be determinable after the panels have been installed. It may be advantageous to replace poorly-performing panels, and/or to swap the positions of better- and worse-performing panels.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mount for an inflatable structure, the mount comprising:
    a device to be mounted;
    inserts coupled to a back side of the device; and
    flexures having respective blades capable of being inserted into the inserts and having respective bases with respective sets of mounting holes, the mounting holes of some of the flexures having at least one of different size or different shape than the mounting holes of other of the flexures;
    wherein the flexures are capable of being mechanically coupled to the inserts and the inflatable structure when the device is mounted on the inflatable structure; and
    wherein the flexures are capable of being mounted to mounting blocks on the inflatable structure when the device is mounted on the inflatable structure.

2. The mount of claim 1,
    wherein the flexures include a first flexure having a first base with a first set of round mounting holes, and a second flexure having a second base with a second set of round mounting holes; and
    wherein the round mounting holes of the second set are oversized mounting holes having a larger diameter than the round mounting holes of the first set.

3. The mount of claim 2,
    wherein the flexures also include a third flexure having a third base with a third set of mounting holes; and wherein the mounting holes of the third set are slotted mounting holes allowing for more variability in positioning in a first direction, than in a second direction that is orthogonal to the first direction.

4. The mount of claim 3, wherein the orientations of the slotted mounting holes are substantially parallel to each other.

5. The mount of claim 3,
wherein the flexures also include a fourth flexure having a fourth base with a fourth set of mounting holes; and
wherein the fourth set of mounting holes are substantially identical to the second set of mounting holes.

6. The mount of claim 5, wherein the flexures are arranged in a rectangular configuration, with the first flexure and the third flexure along a first diagonal of the configuration, and the second flexure and the fourth flexure along a second diagonal of the configuration.

7. The mount of claim 1,
in combination with the mounting blocks;
wherein the bases of the flexures are mounted to the mounting blocks.

8. The combination of claim 7, further comprising threaded fasteners for passing through the mounting holes to secure the flexures to the mounting blocks.

9. A mount for an inflatable structure, the mount comprising:
a device to be mounted;
inserts coupled to a back side of the device; and
flexures having respective blades inserted into the inserts to releasably couple the flexures and the inserts;
wherein the flexures are capable of being mechanically coupled to the inserts and the inflatable structure when the device is mounted on the inflatable structure; and
wherein the inserts have respective releasable locking levers.

10. The mount of claim 9, wherein locking levers have holes therein for securing a release string or other device, for remotely releasing the locking levers.

* * * * *